United States Patent
Yamaguchi et al.

(10) Patent No.: US 6,428,745 B2
(45) Date of Patent: *Aug. 6, 2002

(54) SOLDER, SOLDER PASTE AND SOLDERING METHOD

(75) Inventors: Atsushi Yamaguchi, Moriguchi; Tetsuo Fukushima, Katano; Kenichiro Suetsugu, Nishinomiya; Akio Furusawa, Katano, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/818,905

(22) Filed: Mar. 28, 2001

Related U.S. Application Data

(62) Division of application No. 09/125,013, filed as application No. PCT/JP96/02138 on Jul. 29, 1996, now Pat. No. 6,267,823.

(30) Foreign Application Priority Data

Feb. 9, 1996 (JP) ............................................. 8-23547

(51) Int. Cl.[7] ............................................. C22C 13/02
(52) U.S. Cl. .................... 420/562; 420/561; 148/400
(58) Field of Search .......................... 148/400; 420/562, 420/561

(56) References Cited

U.S. PATENT DOCUMENTS 5,071,058 A    12/1991   Nowotarski (List continued on next page.)

FOREIGN PATENT DOCUMENTS

| DE | 3730764 | * | 7/1988 |
|---|---|---|---|
| EP | 0 307 638 | | 3/1989 |
| EP | 0499452 | | 12/1993 |
| EP | 0 612 587 | | 8/1994 |
| GB | 131299 | | 11/1919 |
| JP | 4-220192 | | 8/1992 |
| JP | 4-270062 | | 9/1992 |
| JP | 4-270063 | | 9/1992 |
| JP | 5-228685 | | 9/1993 |
| JP | 5-318176 | | 12/1993 |
| JP | 6-87090 | | 3/1994 |
| JP | 6-238479 | | 8/1994 |
| JP | 6-344180 | | 12/1994 |
| JP | 7-1179 | | 1/1995 |
| JP | 7-32188 | | 2/1995 |
| JP | 7-51883 | | 2/1995 |
| JP | 7-88679 | | 4/1995 |
| JP | 7-88680 | | 4/1995 |
| JP | 7-88681 | | 4/1995 |
| JP | 7-509662 | | 10/1995 |
| JP | 8-132277 | | 5/1996 |
| JP | 8-132279 | | 5/1996 |

OTHER PUBLICATIONS

"Lead–Free Solders for Electronic Assembly", by Vincent et al., GEC Journal of Research, vol. 11, No. 2 (Jan. 1994), pp. 76–89.

*Primary Examiner*—Sikyin Ip
(74) *Attorney, Agent, or Firm*—McDermott, Will & Emery

(57) ABSTRACT

Disclosed are a solder and a solder paste used for soldering an electronic part to a circuit board. This solder comprises 2.0 to 3.5 wt % of Ag, 5 to 18 wt % of Bi and Sn for the rest. Alternatively, it further contains at least one element selected from the group consisting of 0.1 to 1.5 wt % of In, 0.1 to 0.7 wt % of Cu and 0.1 to 10 wt % of Zn.

1 Claim, 2 Drawing Sheets

U.S. PATENT DOCUMENTS

| | | |
|---|---|---|
| 5,234,508 A | 8/1993 | Kobayashi et al. |
| 5,272,007 A | 12/1993 | Jenkinson et al. |
| 5,328,660 A | 7/1994 | Gonya et al. |
| 5,368,814 A | 11/1994 | Gonya et al. |
| 5,389,160 A | 2/1995 | Melton et al. |
| 5,393,489 A | 2/1995 | Gonya et al. |
| 5,411,703 A | 5/1995 | Gonya et al. |
| 5,415,944 A | 5/1995 | Kazem-Goudarzi et al. |
| 5,429,293 A | 7/1995 | Bradley, III et al. |
| 5,435,857 A | 7/1995 | Han et al. |
| 5,439,639 A | 8/1995 | Vianco et al. |
| 5,540,379 A | 7/1996 | Kazem-Boudarzi et al. |
| 5,821,208 A | 10/1998 | Cala et al. |
| 5,904,782 A | 5/1999 | Diep-Quang |
| 5,918,795 A * | 7/1999 | Yamaguchi et al. ......... 228/200 |
| 6,074,894 A * | 6/2000 | Suetsugu et al. ........... 438/106 |
| 6,077,477 A * | 6/2000 | Sakai et al. ................. 420/560 |

\* cited by examiner

SOLDER, SOLDER PASTE AND SOLDERING METHOD

This application is a Divisional of application Ser. No. 09/125,013 filed Nov. 12, 1998, now U.S. Pat. No. 6,267,823, which is a 371 of International Application Serial No. PCT/JP96/02138 filed Jul. 29, 1996.

TECHNICAL FIELD

The present invention relates to a solder, a solder paste and a soldering method used in soldering an electronic circuit board.

BACKGROUND ART

In recent years, downsizing of an electronic part and high density mounting of such part have been advanced rapidly in the technology for mounting an electronic part to an electronic circuit board. As a result, there has been a rapid and increasing demand for a solder material to facilitate an advanced bonding and the like of an electronic part with narrow pitching and sufficient strength. In addition, while there is a growing concern to the environment, a move to implement legal regulations for the disposal of industrial wastes such as electronic circuit board has been observed.

In the following, one example of a conventional solder material will be described referring to the drawings. FIG. 3 shows the microstructure of the conventional solder alloy and the microstructure at the bonding interface between the conventional solder material and a copper land. In FIG. 3, numeral 1 designates an α-solid solution with an Sn-rich phase. Numeral 2 designates a β-solid solution with a Pb-rich phase. Numeral 3 designates an intermetallic compound whose composition is $Cu_3Sn$. Numeral 4 designates another intermetallic compound whose composition is $Cu_6Sn_5$. Numeral 5 designates a Cu land.

The conventional solder as shown above used to be an eutectic alloy of Sn and Pb, which is composed of 63% by weight of Sn and 37% by weight of Pb and whose eutectic point is 183° C. In addition, the alloy had a microstructure where the α-solid solution 1 and the β-solid solution 2 are in the lamellar state. Moreover, the intermetallic compounds 4 and 5 were formed on the solder/copper land bonding interface.

In recent years, from the standpoint of environmental protection, it has been under rapid progress in the world to regulate the use of lead which is a poisonous substance contained in the solder material (Sn—Pb alloy). The conventional solder material had a problem that upon exposure to acid-rain of a waste of a printed circuit board with soldering of the conventional solder material, there occurs voluminous elution of the poisonous substance lead, whose toxicity induces adverse effects on the human body of neuropathy and the like. The conventional solder material had also another problem that since it has a lamellar structure in its alloy, the microstructure is thickened upon exposure to a high-temperature environment and a slip occurs on the microstructural interface of the solder upon application of a force on the solder, inducing crack development thereon. Moreover, the conventional solder material had still another problem that at soldering and under the high-temperature environment, double-layered hard and fragile intermetallic compounds will grow on the solder/copper land bonding interface, inducing crack development on the bonding interface.

DISCLOSURE OF THE INVENTION

In view of the above-mentioned problems, the present invention is aimed at a provision of a solder which is free from lead, has a pulverized alloy structure and develops no cracks thereon.

The present invention is also aimed at a provision of a solder which has been suppressed with respect to the growth of intermetallic compounds on the solder/copper land bonding interface and is excellent in the high temperature resistance.

The present invention further provides a solder paste using such solder, and a soldering method using the solder paste.

The present invention provides a solder comprising 2.0 to 3.5 wt % of Ag, 5 to 18 wt % of Bi and Sn for the rest.

The present invention also provides a solder comprising 2.0 to 3.5 wt % of Ag, 5 to 18 wt % of Bi and further at least one element selected from the group consisting of 0.1 to 1.5 wt % of In, 0.1 to 0.7 wt % of Cu and 0.1 to 10 wt % of Zn, along with Sn for the rest.

The solder paste in accordance with the present invention is composed of a powder of the above-mentioned solder and a flux.

Herein, the flux is composed of at least rosin, an activator, a thixotropic agent and a solvent.

BEST MODE FOR EMBODYING THE INVENTION

Figure 1:
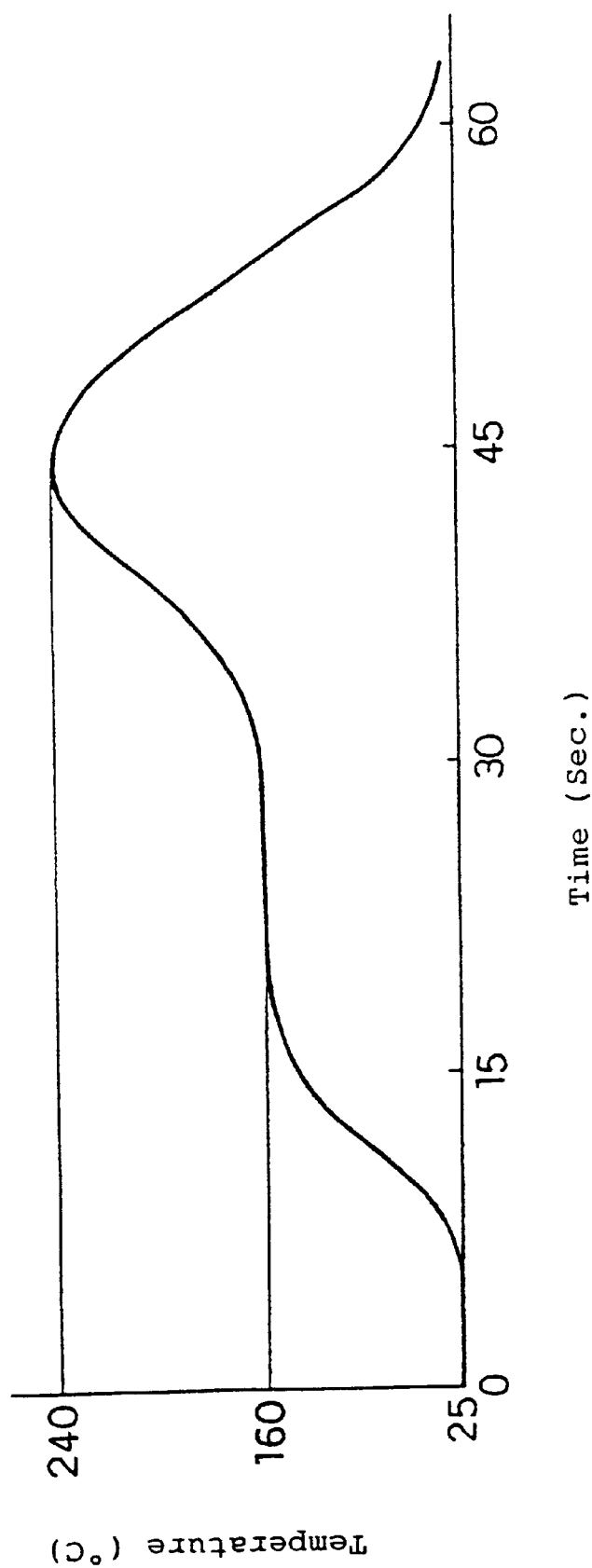
FIG. 1 is a chart showing a reflow profile of one example in accordance with the present invention.

The lead-free solder in accordance with the present invention whose essential component is Sn further includes 2.0 to 3.5 wt % of Ag and 5 to 18 wt % of Bi.

By an addition of Ag, it is possible to obtain a solder with a fine microstructure which is excellent in heat resistance, such as resistance against thermal embrittleness. When the content of Ag is below 2.0 wt %, a sufficient improving effect on the heat resistance is not obtained. In addition, when the content of Ag is over 3.5 wt %, the resultant alloy shows an abrupt elevation in its melting point. In order that an alloy for solder paste can have a preferable melting point of 220° C. or less, the upper limit of Ag contained in the alloy should be 3.5 wt %. Therefore, an Ag content of 2.0 to 3.5 wt % is suited.

In addition, by an addition of Bi, it is possible to lower the melting point of the resultant solder thereby improve the wettability thereof. When the content of Bi is below 5 wt %, it is impossible to have the above-mentioned effect sufficiently. Furthermore, when the content of Bi is over 18 wt %, it is impossible for the resultant alloy to have a satisfactory soldering strength. Therefore, a preferred content of Bi is 5 to 18 wt %.

The solder in accordance with the present invention further includes at least one element selected from the group consisting of 0.1 to 1.5 wt % of In, 0.1 to 0.7 wt % of Cu and 0.1 to 10 wt % of Zn.

An addition of Cu suppresses the growth of intermetallic compounds on the solder/copper land bonding interface thereby improving the strength on the bonding interface. A Cu content below 0.1 wt % does not produce such effect for an alloy. In addition, when the content is over 0.7 wt %, the resultant alloy becomes hard and fragile. Accordingly, a preferred content of Cu is 0.1 to 0.7 wt %.

In improves the expansion and the heat resistance such as resistance against thermal embrittlement of an alloy. A content of In below 0.1 wt % does not produce such effects for an alloy. In addition, when the content is over 1.5 wt %, the resultant alloy is impaired for its mechanical strength. Accordingly, a preferred content of In is 0.1 to 1.5 wt %.

An addition of Zn causes pulverization of the microstructure of the resultant alloy and improves its strength. An Sn—Ag alloy carries a fine microstructure in which intermetallic compounds of Sn and Ag are studded in the form of needle-like crystals. Upon growth of such needle-like crystals, the alloy becomes fragile. Addition of Zn suppresses the growth of the above-mentioned needle-like crystals. A content of Zn below 0.1 wt % does not produce such effect. In addition, when the content is over 10 wt %, the excess Zn reacts with a flux, making the resultant paste viscous, which impairs the long-term stock of the paste as a solder paste. A suitable content of Zn is 0.1 to 10 wt %.

The solder paste in accordance with the present invention is prepared by adding a flux to a powder of the above-mentioned solder so as to make a paste. The flux is composed essentially of about 30 to 70 wt % of solids, such as rosin for imparting fluidity and viscosity to the paste, a small amount of an activator, a thixotropic agent for keeping the shape and a viscosity improver which is added if occasion demands, and about 70 to 30 wt % of a solvent.

The flux used in the present invention is not limited to a particular one. Whether the reflow atmosphere is the air or nitrogen atmosphere, those fluxes of RA type with a relatively high activity and those fluxes of RMA type with a relatively low activity which require no rinsing are usable. Of those, RMA type fluxes for use in the air are suited.

The soldering method in accordance with the present invention by a reflow soldering technique using the above-mentioned solder paste is characterized in that immediately after a passage of a soldering object with the solder paste through an area showing a peak temperature in a reflow furnace, it is cooled at a cooling rate of about 10° C./sec or more.

The present invention melts the solder at a peak temperature of 240 to 250° C. of a reflow furnace. And, in solidifying the molten solder, rapid cooling as mentioned before suppresses the growth of intermetallic compounds such as $Ag_3Sn$, $Cu_3Sn$, $Cu_6Sn_5$ and the like, and pulverizes and disperses $Ag_3Sn$, thereby improving the mechanical strength and heat resistance at the joint.

In the following, the present invention will be described by way of examples.

Table 1 lists the compositions of the solders in accordance with Examples 1 to 5 and Comparative Examples 1 and 2, and the characteristics of those solders.

TABLE 1

| | Solder composition (wt %) | | | | | | | Melting point (° C.) | Wettability (%) | Bonding strength (kgf) | Thermal shock resistance |
|---|---|---|---|---|---|---|---|---|---|---|---|
| | Sn | Ag | Bi | Cu | In | Zn | Pb | | | | |
| Example 1 | rest | 3.5 | 6 | | | | | 210–216 | 88.9 | 1.0 | Good |
| Example 2 | rest | 3 | 10 | 0.5 | 1 | | | 197–207 | 88.9 | 1.2 | Good |
| Example 3 | rest | 3 | 10 | 0.5 | 1 | | | 187–201 | 89.1 | 1.3 | Good |
| Example 4 | rest | 3 | 15 | | | 5 | | 187–203 | 88.7 | 1.5 | Good |
| Example 5 | rest | 3 | 15 | | | 5 | | 198–209 | 88.5 | 1.7 | Good |
| Comparative Example 1 | rest | 3.5 | | | | | | 221 | 84 | 1.3 | Good |
| Comparative Example 2 | rest | | | | | | 37 | 183 | 89.8 | 1.0 | Bad |

Melting points were determined by thermal analysis of the respective solders.

For evaluating the wettability, bonding strength and thermal shock test of the solders, various solder pastes were prepared by mixing each of the powders of the respective solders (each mean particle size: about 30 to 40 $\mu$m) with the below-mentioned flux at a weight ratio of 9:1. Here, a flux of the RMA type for use in air reflow which has the composition shown in Table 2 was used.

TABLE 2

| Solvent | Diethylene glycol-2-ethylhexyl ether | 40 wt % |
|---|---|---|
| Rosin | Gum rosin | 55 wt % |
| Activator | Diphenylguanidine hydrobromide | 1 wt % |
| Thixotropic agent | Caster oil | 4 wt % |

Wettability was evaluated as follows. First, a certain amount of each of the above-mentioned solder pastes was printed on a copper plate. In an assumption that the solder paste thus printed has a real spherical shape on the copper plate, the diameter of the sphere is defined as D. Next, upon heating the copper plate to 240° C., the solder paste is spread over the copper plate while wetting it. The height of the solder paste measured during this process is defined as H.

The wettability of the solder paste is represented by $100 \times (D-H)/D$ (%); the higher the value, the better the wettability.

The bonding strength was evaluated as follows. After printing each of the solder pastes on a board, an electronic part QFP (quad flat package) with a lead terminal pitch of 0.5 mm was mounted on the board using a placement equipment in order to adhere the QFP to the board by passing it through a reflow furnace having the reflow profile as shown in FIG. 1. The QFP and the board were preheated in the reflow furnace at 160° C. and immediately after they passed through an area showing a peak temperature of 240° C., they were cooled at a cooling rate of 15° C./sec using a blower. The lead terminal of the QFP which was adhered to the board in this way was hooked and pulled on at an angle of 45° to the board in order to measure the strength upon dissection of the lead terminal from the joint between the lead terminal and the board. The result represents the bonding strength.

Thermal shock resistance was evaluated by the presence or absence of cracks on the joint after repeating 500 cycles of operation each comprising preliminary retention of a board to which an electronic part has been adhered in the aforementioned manner for 30 min at −40° C., followed by retention for 5 min at room temperature and for 30 min at 80° C., respectively.

As is evident from Table 1, the solder in accordance with the present invention has a melting point of 220° C. or less which is suited for the reflow soldering technique, and thus it permits soldering at a temperature which does not injure electronic parts. In addition, the solder paste using the solder in accordance with the present invention shows satisfactory wettability to metallic copper, eliminating impairment of the bonding strength due to poor wettability. Furthermore, the joint finished with the reflow soldering technique using this solder paste is sufficiently strong and manifests excellent heat resistance, such as no crack development upon thermal shock test where a cold-hot retention cycle is repeated.

Figure 2:
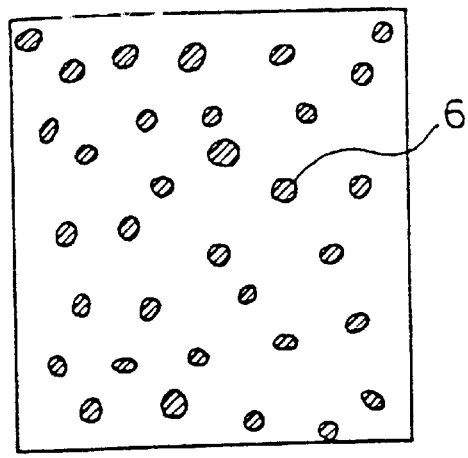
FIG. 2 is a picture showing a microstructure of a solder alloy of one example in accordance with the present invention.
Figure 3:
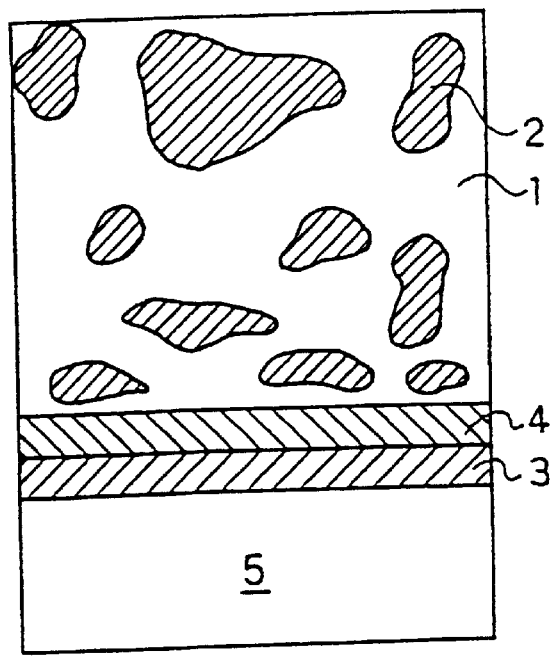
FIG. 3 is a picture showing the microstructure of the conventional solder alloy and the microstructure on the solder/copper land bonding interface.

And, FIG. 2 shows the microstructure of the solder alloy in accordance with the present invention at about 1,000 magnifications. Numeral 6 designates an intermetallic compound $Ag_3Sn$ which is a deposition in the alloy. As is apparent from the comparison with FIG. 3, the intermetallic compound shows a fine distribution in FIG. 2. This gives a joint which is less likely to change with time and manifests excellent heat resistance, such as resistance against thermal embrittleness, under high temperature environment. In order to have such pulverized alloy microstructure, it is preferable in solidifying the solder to cool it at a cooling rate of 10° C./sec or more. Cooling rates slower than that permit growth of intermetallic compound, making it impossible to have a fine alloy microstructure. The aforementioned cooling condition can be achieved by air cooling using a fan.

INDUSTRIAL USABILITY

As discussed above, according to the present invention, a solder which is free of a poisonous substance lead and excellent in both mechanical strength and heat resistance can be obtained.

In addition, the solder paste in accordance with the present invention is fit for reflow soldering, facilitating high density mounting of an electronic part.

What is claimed is:

1. A solder consisting of 2.0 to 3.5 wt % of Ag, 5 to 18 wt % of Bi and at least one element selected from the group consisting of 0.1 to 1.5 wt % of In and 0.1 to 0.7 wt % of Cu, along with Sn for the rest.

* * * * *